United States Patent [19]

Tarantino

[11] 4,191,261
[45] Mar. 4, 1980

[54] HAND OPERATED TOOL WITH CENTRAL OPENING IN UPPER PORTION

[76] Inventor: Phillip Tarantino, 6767 Northland Rd., Manteca, Calif. 95336

[21] Appl. No.: 890,044

[22] Filed: Mar. 27, 1978

[51] Int. Cl.² ............................................. A01B 1/10
[52] U.S. Cl. .................................................... 172/371
[58] Field of Search ............... 172/371, 372, 375, 724, 172/730; D8/10

[56] References Cited

U.S. PATENT DOCUMENTS

| 2,291,144 | 7/1942 | Brownsey | 172/372 |
| 2,315,074 | 3/1943 | Olsen | 172/371 |

FOREIGN PATENT DOCUMENTS

| 664610 | 8/1938 | Fed. Rep. of Germany | 172/375 |
| 10407 | of 1915 | United Kingdom | 172/372 |

*Primary Examiner*—Richard T. Stouffer
*Attorney, Agent, or Firm*—Jack L. Bohan

[57] ABSTRACT

A hand, utility tool for general hoeing and cultivating purposes but being particularly adapted for the making of furrows for planting of seeds. The tool is capable of quickly and efficiently producing seed furrows by virtue of the unique design of the device. This design including an arcuate upper portion provided with a central opening. This upper portion is attached to a handle on the rearward edge thereof and converges to a downwardly curving central member along the forward edge thereof. The central member is affixed to a triangular body or sweep at its lower end, whereby the triangular body is separated from the upper portion. The triangular body is provided with two diverging blades having a twist therein, so that the trailing edge is slightly higher than the leading edge.

1 Claim, 3 Drawing Figures

FIG I

HAND OPERATED TOOL WITH CENTRAL OPENING IN UPPER PORTION

BACKGROUND OF THE INVENTION

Standard hose and triangular-shaped hoes have been the traditional implements for the creating of furrows for seedbeds. However, the standard hoe is generally difficult to use since it is difficult to control for the purpose of making a straight furrow. The triangular-shaped hoe with the point distending downwardly allows the creation of a comparatively straight furrow, however, the dirt displaced onto the shoulders along the sides of the furrow frequently roll back in making it difficult to create a furrow of uniform depth.

An example of a prior art device is that shown in U.S. Pat. No. 2,240,705 issued to C. B. Klopfenstein on May 6, 1941. This device having an adjustable triangular head mounted on the handle can be adjusted to a position so as to place the triangular head at or close to a right angle position with respect to the axis of the rake allowing it to form a furrow for planting of seeds. This prior art device, however, does not contain the opening or aperture of the present invention nor does it contain leading edges which are separated from the main body of the device.

An example of a prior art disclosing a perforated hoe head is that issued to C. N. Choate on Mar. 28, 1905, as disclosed in U.S. Pat. No. 785,860. This device does include an opening, however, the lower edge of the opening is substantially horizontal and in addition the cutting edge of the hoe is configured in a manner of a conventional hoe with a horizontal edge. As will be shown in detail below, the device of the present invention contains a triangular cutting point and other structural features distinct from the Choate unit. Moreover, the opening in the device of the present invention does not have a horizontal lower surface but a V or trough-shaped lower surface which performs a unique function, as will be described in detail hereinafter.

SUMMARY OF THE INVENTION

The hand utility tool of the present invention is provided with an arcuate upper portion having at the rearward edge means for attaching it to a suitable handle. The forward edge converges to a downwardly curving central member affixed to a triangular body or sweep. The point of the triangular body points directly back to the operator when the handle is held in a normal position. The diverging edges of the triangular body have a leading edge and a trailing edge which are separated from the remainder of the unit creating a unique furrowing effect when drawn through the soil. These two diverging blades have a twist therein so that the trailing edge is slightly higher than the forward edge, creating a snowplow effect so as to force debris high onto the shoulders on each side of the furrow. Various other features of the device will be hereinafter more fully explained by reference to the drawings herein.

DETAILED DESCRIPTION

Figure 1:
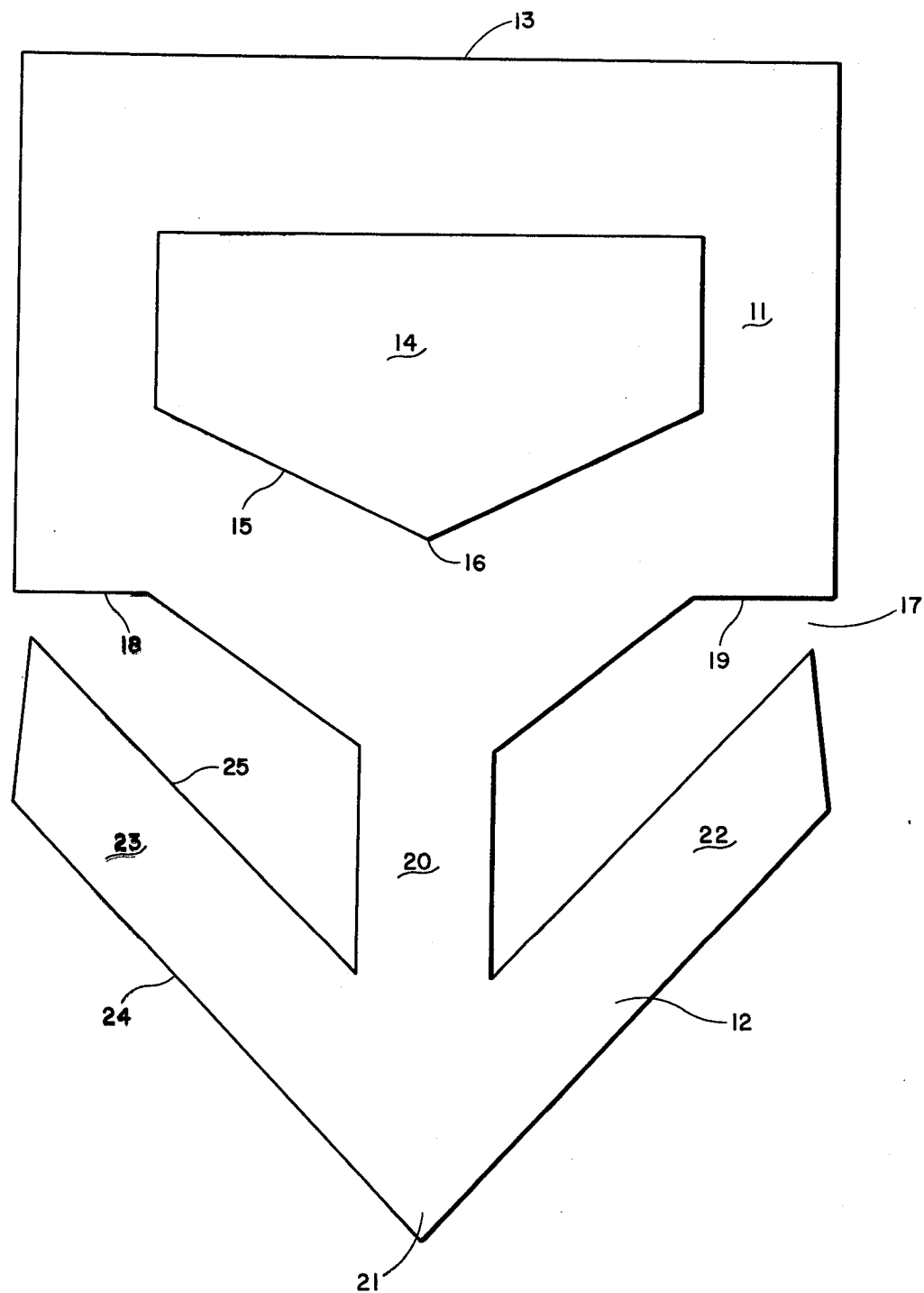
FIG. 1 is a plan view of the blank from which the head of the tool is formed.

The invention herein disclosed is comprised of a handle, a socket and a cutting head of unique configuration. This cutting head is formed from a blank shown in plan view in FIG. 1, which is comprised essentially of two basic components, an arcuate upper portion 11 and a triangular cutting blade 12. The rearward edge 13 of the upper portion is affixed to the handle by means of a socket (not shown). Centrally located within said upper portion 11 is an aperture 14, the upper portion of which is substantially parallel to the rearward edge 13 and the lower edge 15 forms a V or trough with a point 16 centrally located. The forward edge 17 of the upper portion 11 first forms shoulders 18 and 19 whereupon the forward edge diverges to a centrally disposed distending member 20. This distending member 20 terminates with the triangular cutting blade 12. The triangular cutting blade 12 is comprised of a triangular cutting point 21, having two diverging cutting blades 22 and 23. Each cutting blade has a leading edge 24 and a trailing edge 25, with the leading edge preferably formed into a cutting edge. In a typical unit the opening 14 is spaced approximately one inch inwardly from the edges of upper portion 11. For typical home garden use the unit can be made from a blank approximately six inches wide and approximately nine to ten inches long. Suitable materials from which the unit may be fabricated are: steel, aluminum or other appropriate durable materials.

Figure 2:
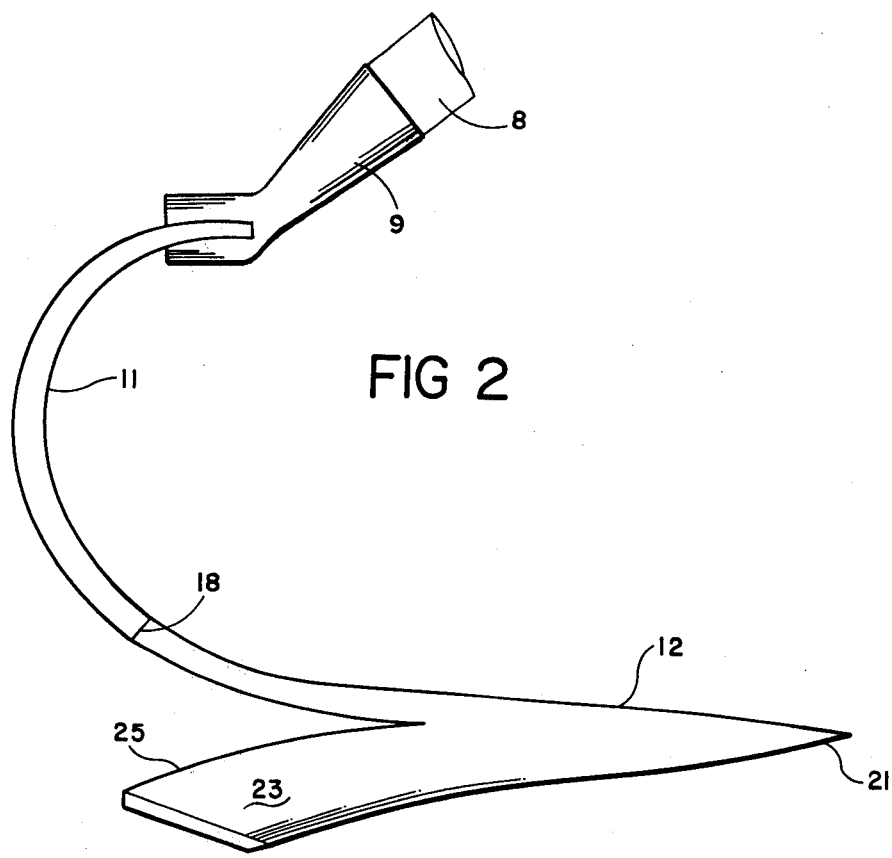
FIG. 2 is a side elevation view of the device in its working position.
Figure 3:
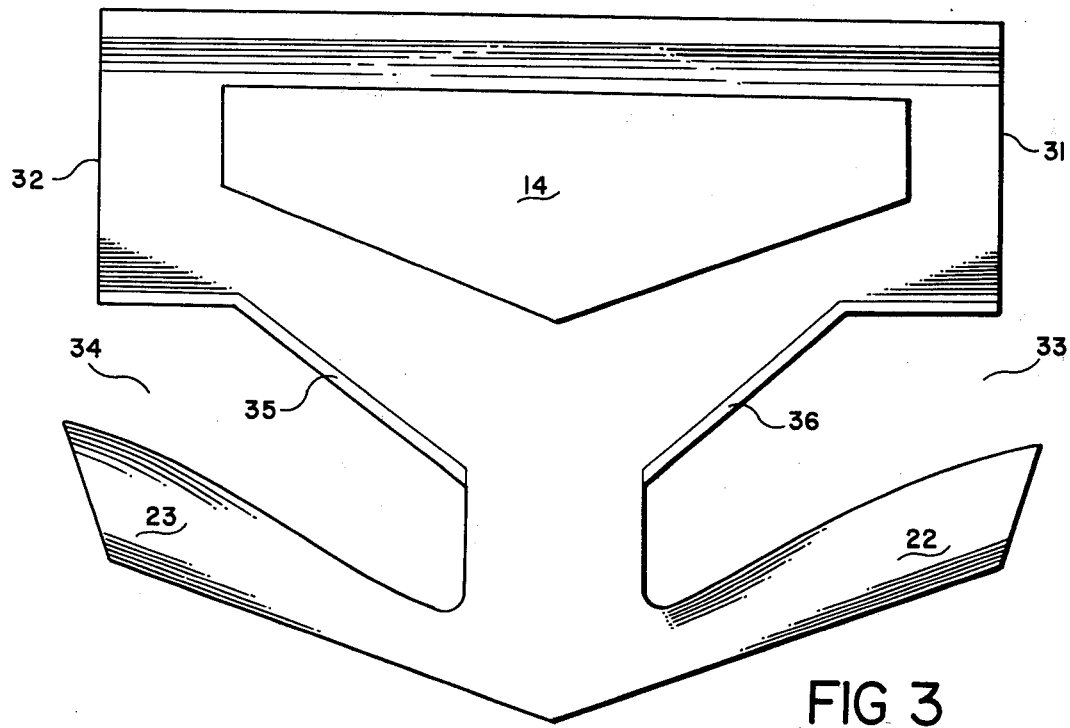
FIG. 3 is an elevation view of the head of the device in its normal working position.

Referring now to FIG. 2, the hand tool of the present invention is shown with the blank as described in FIG. 1 above, bent into a curved configuration. The arcuate upper portion 11 is attached to socket 9 by appropriate means such as bolts or welding. The socket 9 is designed to accommodate a handle 8 of appropriate length to be held by the operator. The triangular cutting blade 12 is shown resting on the ground with triangular point 21 and diverging cutting edge 23 extending rearwardly. The cutting edges are twisted so that the leading edge 24 is lower than the trailing edge 25. This produces a sweeping effect so that dirt and material is swept out of the furrow onto the shoulders on each side of the furrow. If the device is pulled through the ground at a rapid speed, the dirt and material will be thrown farther back from the edge of the furrow. Various types of soil require different treatment with the device of the present invention and it will become quickly apparent to the operator what particular technique is most effective for the particular soil. For example, an uneven textured soil, as the device is drawn through the soil, the larger particles and bulk of the dirt is either thrown up onto the shoulders by the cutting blades 22 and 23 or, as shown in FIG. 3, is pulled up into the arcuate upper portion 11 and emerges out sides 31 and 32 onto the shoulders. The opening 14 at first allows large particles of dirt, rocks and other material to pass through the opening in the process of transferring most of the soil onto the shoulders of the furrow. In order to remove these heavier items from the furrow, the most effective way is to usually lower the handle somewhat and slightly increase the speed with which the device is pulled through the furrow. Accordingly, by subsequent passes, the furrow can be cleared of all large particles which would inhibit seed growth. The device can then be pulled through the furrow for a final pass so that fine dirt is pulled up and deposited down the center of the furrow by passing up the device to point 16 in aperture 14. The material spills over the aperture at point 16 so as to create a thin layer of well loosened soil on which to deposit the seeds. The separation of the cutting blades 23 and 24 from the forwarding diverging edges 35 and 36 of the upper portion 11 results in a self-cleaning action so that the dirt will tend to be broken up instead of forming large, unmanageable clumps as the device is drawn through the soil.

Obviously, numerous alternatives to the basic configuration of the device may be made without departing from the spirit of the invention. The degree of twist of the two cutting blades can be varied in accordance with the soil conditions as can the distance separating the trailing edges of said blades from the upper portion of the unit so as to effect the desired self-cleaning effect for the particular soil involved.

Accordingly, although there has been shown and described a particular embodiment of this invention, it will be obvious to those skilled in the art that various changes and modifications may be made therein without departing from the invention.

I claim:

1. In a hand operated tool for pulling through soil in a direction of travel toward the operator comprising: an arcuate upper portion having a forward edge and a rearward edge, said upper portion forming on the underside thereof a single, horizontal, generally-cylindrical cavity with an axis substantially transverse to said direction of travel;

a downwardly curving centrally disposed member distending from said forward edge, said centrally disposed member terminating in a triangular cutting point; two rearwardly extending cutting blades diverging from said cutting point, each said blade having a leading edge and a trailing edge, said leading edges of said cutting blades being at a lower height than said trailing edges; and handle means centrally affixed to the rearward edge of said upper portion, said centrally disposed member being of such length that the trailing edge of said cutting blades is a predetermined distance from the forward edge of said upper portion, and being of such curvature that the triangular cutting point points generally rearwardly at a predetermined acute angle to said handle, said arcuate upper portion being provided between said forward edge and said rearward edge with a generally central opening over a substantial area thereof, said opening having a top edge, two side edges and a bottom edge, said bottom edge sloping downwardly from the side edges to form a centrally located, v-shaped point in substantial alignment with said triangular cutting point.

* * * * *